(12) United States Patent
Taylor et al.

(10) Patent No.: US 11,303,653 B2
(45) Date of Patent: Apr. 12, 2022

(54) NETWORK THREAT DETECTION AND INFORMATION SECURITY USING MACHINE LEARNING

(71) Applicant: Bank of America Corporation, Charlotte, NC (US)

(72) Inventors: Jo-Ann Taylor, Godalming (GB); Michael J. Sbandi, Charlotte, NC (US); Benjamin F. Tweel, Romeoville, IL (US)

(73) Assignee: Bank of America Corporation, Charlotte, NC (US)

( * ) Notice: Subject to any disclaimer, the term of this patent is extended or adjusted under 35 U.S.C. 154(b) by 382 days.

(21) Appl. No.: 16/538,549

(22) Filed: Aug. 12, 2019

(65) Prior Publication Data

US 2021/0051162 A1 Feb. 18, 2021

(51) Int. Cl.
*H04L 9/40* (2022.01)
*H04L 29/06* (2006.01)
*G06N 20/00* (2019.01)

(52) U.S. Cl.
CPC ......... *H04L 63/1416* (2013.01); *G06N 20/00* (2019.01); *H04L 63/1425* (2013.01); *H04L 63/1466* (2013.01)

(58) Field of Classification Search
CPC ............. H04L 63/1416; H04L 63/1466; H04L 63/1425; H04L 63/145; H04L 63/1491; G06N 20/00; G06N 3/08
USPC .......................................................... 726/26
See application file for complete search history.

(56) References Cited

U.S. PATENT DOCUMENTS

| | | | |
|---|---|---|---|
| 7,483,972 B2 | 1/2009 | Bhattacharya et al. | |
| 7,519,998 B2 | 4/2009 | Cai et al. | |
| 7,526,806 B2 | 4/2009 | Wiley et al. | |
| 7,603,709 B2 | 10/2009 | Lewis et al. | |
| 7,607,041 B2 | 10/2009 | Kraemer et al. | |
| 7,624,444 B2 * | 11/2009 | Gupta ..................... G06F 21/55 | |
| | | | 713/192 |
| 7,779,471 B2 | 8/2010 | Balasubramaniyan et al. | |
| 7,784,099 B2 | 8/2010 | Benjamin | |
| 7,854,002 B2 | 12/2010 | Mohanan et al. | |
| 8,028,160 B1 | 9/2011 | Orr | |

(Continued)

FOREIGN PATENT DOCUMENTS

| | | |
|---|---|---|
| EP | 2890079 A1 | 7/2015 |
| EP | 3053084 A1 | 8/2016 |

(Continued)

*Primary Examiner* — Badri Narayanan Champakesan

(57) ABSTRACT

An information security system that includes an information security engine configured to monitor data transmissions within a network and to detect a first attack by a malicious software element. The information security engine is further configured to detect a second attack by the malicious software element within a predetermined time interval from the first attack and to transfer the malicious software element from the network to an emulated network in response to detecting the second attack. The information security engine is further configured to generate an attack log comprising behavior characteristics for attacks performed by the malicious software element in the emulated network and to train a machine learning model based on behavior characteristics from the attack log.

17 Claims, 3 Drawing Sheets

(56) References Cited

U.S. PATENT DOCUMENTS

| | | | |
|---|---|---|---|
| 8,141,127 B1* | 3/2012 | Mustafa | G06F 21/552 |
| | | | 726/1 |
| 8,230,498 B2 | 7/2012 | Shaffer et al. | |
| 8,261,355 B2 | 9/2012 | Rayes et al. | |
| 8,438,644 B2 | 5/2013 | Watters et al. | |
| 8,488,488 B1 | 7/2013 | Hermanns et al. | |
| 8,504,876 B2 | 8/2013 | Mork et al. | |
| 8,769,684 B2* | 7/2014 | Stolfo | H04L 63/1491 |
| | | | 709/224 |
| 8,997,219 B2* | 3/2015 | Staniford | H04L 63/1491 |
| | | | 726/22 |
| 9,141,805 B2 | 9/2015 | Giakouminakis et al. | |
| 9,177,157 B2 | 11/2015 | Binder | |
| 9,197,665 B1* | 11/2015 | Cabot | H04L 29/06 |
| 9,398,035 B2 | 7/2016 | Kambhatla | |
| 9,413,779 B2 | 8/2016 | Vasseur et al. | |
| 9,419,996 B2 | 8/2016 | Porat et al. | |
| 9,641,542 B2 | 5/2017 | Vasseur et al. | |
| 9,674,207 B2* | 6/2017 | Di Pietro | H04L 63/1458 |
| 9,680,845 B2* | 6/2017 | Langton | H04L 63/1416 |
| 9,690,933 B1 | 6/2017 | Singh et al. | |
| 9,838,409 B2 | 12/2017 | Flacher et al. | |
| 9,928,155 B2* | 3/2018 | Xu | G06F 11/3636 |
| 9,961,096 B1* | 5/2018 | Pierce | H04L 63/1425 |
| 10,038,713 B2 | 7/2018 | Vasseur et al. | |
| 10,063,575 B2 | 8/2018 | Vasseur et al. | |
| 10,063,578 B2 | 8/2018 | Flacher et al. | |
| 10,078,752 B2 | 9/2018 | Berg et al. | |
| 10,114,954 B1 | 10/2018 | Bellis et al. | |
| 10,122,743 B2 | 11/2018 | Ridley | |
| 10,169,135 B1 | 1/2019 | Pandey et al. | |
| 10,193,913 B2 | 1/2019 | Machlica et al. | |
| 10,320,824 B2 | 6/2019 | Vasseur et al. | |
| 10,440,037 B2* | 10/2019 | Thayer | G06N 20/00 |
| 10,462,116 B1* | 10/2019 | Sharifi Mehr | H04L 63/062 |
| 10,635,813 B2* | 4/2020 | Saxe | G06F 21/563 |
| 10,664,619 B1* | 5/2020 | Marelas | G06N 5/003 |
| 10,749,894 B2* | 8/2020 | Le | H04L 63/1441 |
| 10,795,996 B2* | 10/2020 | Chistyakov | G06F 21/565 |
| 10,880,270 B1* | 12/2020 | Rigor | H04L 63/0263 |
| 11,012,472 B2* | 5/2021 | Milazzo | H04L 63/1425 |
| 2008/0172382 A1 | 7/2008 | Prettejohn | |
| 2008/0270601 A1 | 10/2008 | Ishikawa | |
| 2009/0013405 A1 | 1/2009 | Schipka | |
| 2012/0210422 A1 | 8/2012 | Friedrichs et al. | |
| 2013/0305357 A1 | 11/2013 | Ayyagari et al. | |
| 2013/0326625 A1 | 12/2013 | Anderson et al. | |
| 2015/0195145 A1 | 7/2015 | Di Pietro et al. | |
| 2015/0355957 A1* | 12/2015 | Steiner | G06F 11/0709 |
| | | | 714/37 |
| 2016/0065601 A1* | 3/2016 | Gong | H04L 63/145 |
| | | | 726/23 |
| 2017/0048698 A1* | 2/2017 | Choffnes | G06N 20/00 |
| 2018/0004958 A1 | 1/2018 | Reinecke et al. | |
| 2018/0060159 A1 | 3/2018 | Justin et al. | |
| 2018/0083999 A1 | 3/2018 | Cherian | |
| 2018/0159871 A1 | 6/2018 | Komashinskiy et al. | |
| 2018/0219887 A1 | 8/2018 | Luo et al. | |
| 2019/0018960 A1* | 1/2019 | Chistyakov | G06F 21/565 |

FOREIGN PATENT DOCUMENTS

| | | |
|---|---|---|
| EP | 3092742 A1 | 11/2016 |
| WO | 2005011195 A2 | 2/2005 |
| WO | 2012168898 A1 | 12/2012 |

* cited by examiner

NETWORK THREAT DETECTION AND INFORMATION SECURITY USING MACHINE LEARNING

TECHNICAL FIELD

The present disclosure relates generally to information security, and more specifically to information security using machine learning.

BACKGROUND

Many computer systems have expansive networks that include a large number of network devices. These computer systems allow data to be shared among the different network devices. One of the technical challenges that occurs in a computer system is controlling unauthorized access to data and data exfiltration. For example, a bad actor may employ malware to extract and exfiltrate data from a network. Existing threat detection systems rely on searching for known malware signatures (e.g. file names or code) to detect the presence of malware. Over time a bad actor may continue to evolve malware such that its signature changes and becomes more difficult to detect. This poses a technical challenge for detecting the presence of malware and for providing information security.

SUMMARY

Many computer systems have expansive networks that include a large number of network devices. These computer systems allow data to be shared among the different network devices. One of the technical challenges that occurs in a computer system is controlling unauthorized access to data and data exfiltration. For example, a bad actor may employ malware to extract and exfiltrate data from a network. Existing threat detection systems rely on searching for known malware signatures (e.g. file names or code) to detect the presence of malware. Over time a bad actor may continue to evolve malware such that its signature changes and becomes more difficult to detect. This poses a technical challenge for detecting the presence of malware and for providing information security.

Once malware is downloaded by the computer system, the malware can overload computing resources by running unauthorized programs and scripts on the system. In addition, malware can cause problems such as disruptions to computer operations, data exfiltration, unauthorized access to system resources, slower processing speeds, connectivity issues, and frequent freezing or crashing. While computing resources are occupied by malware, the computer system has less processing resources and memory to perform other operations. This results in reduced performance of the system. Malware may also reduce the network bandwidth of the computer system by making unauthorized downloads or exfiltrating data from the computer system. Reducing the network bandwidth of the computer system limits the system's ability to send and receive data which degrades the throughput of the system.

The system disclosed in the present application provides a technical solution to the technical problems discussed above by using machine learning to detect the presence of malware in a computer network. The disclosed system provides several practical applications and technical advantages which include 1) a process for detecting malware that uses machine learning for performing network attacks, 2) a process for isolating malware from network resources and collecting behavior characteristics for the malware, and 3) a process for using machine learning to improve information security of the network based on observed behavior characteristics of malware.

In one embodiment, an information security system is configured to detect network attacks and machine learning types of network attacks that are performed by a malicious software element (e.g. malware) within a network. Machine learning types of network attacks are attacks where a malicious software element changes or adapts its attack approach based on the how the network responds to an attack. For instance, a malicious software element may perform a data exfiltration type attack to extract data from the network and to transmit the extracted data to an unauthorized device that is located outside of the network. As an example, a machine learning type of attack may involve adjusting data transfer file sizes when attempting to exfiltrate data from the network. In this example, a malicious software element may first attempt to extract a particular amount of data from the network. The network may be configured to block any data transmissions that exceed a predefined data transfer limit. In the event that the malicious software element's first attempt is blocked, the malicious software element may attempt to extract and transmit progressively smaller amounts of data from the network until it is able to successfully exfiltrate data from the network.

The information security system is further configured to isolate a malicious software element within an emulated network and to document the behavior of the malicious software element in an attack log. Here, the information security system relocates the malicious software element to a safe location where the behavior of the malicious software element can be observed and documented. The attack log comprises information about the behavior characteristics of a malicious software element. The information security system is further configured to train a machine learning model to detect and terminate future machine learning types of attacks based on the information in the attack log. This process allows the information security system to learn new behavior patterns for attacks on the network and to improve information security defenses based on the learned behavior patterns.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The system disclosed in the present application provides a technical solution to the technical problems discussed above by using machine learning to detect the presence of malware in a computer network. The disclosed system provides several practical applications and technical advantages which include 1) a process for detecting malware that uses machine learning for performing network attacks, 2) a process for isolating malware from network resources and collecting behavior characteristics for the malware, and 3) a process for using machine learning to improve information security of the network based on observed behavior characteristics of malware.

Information Security System

Figure 1:
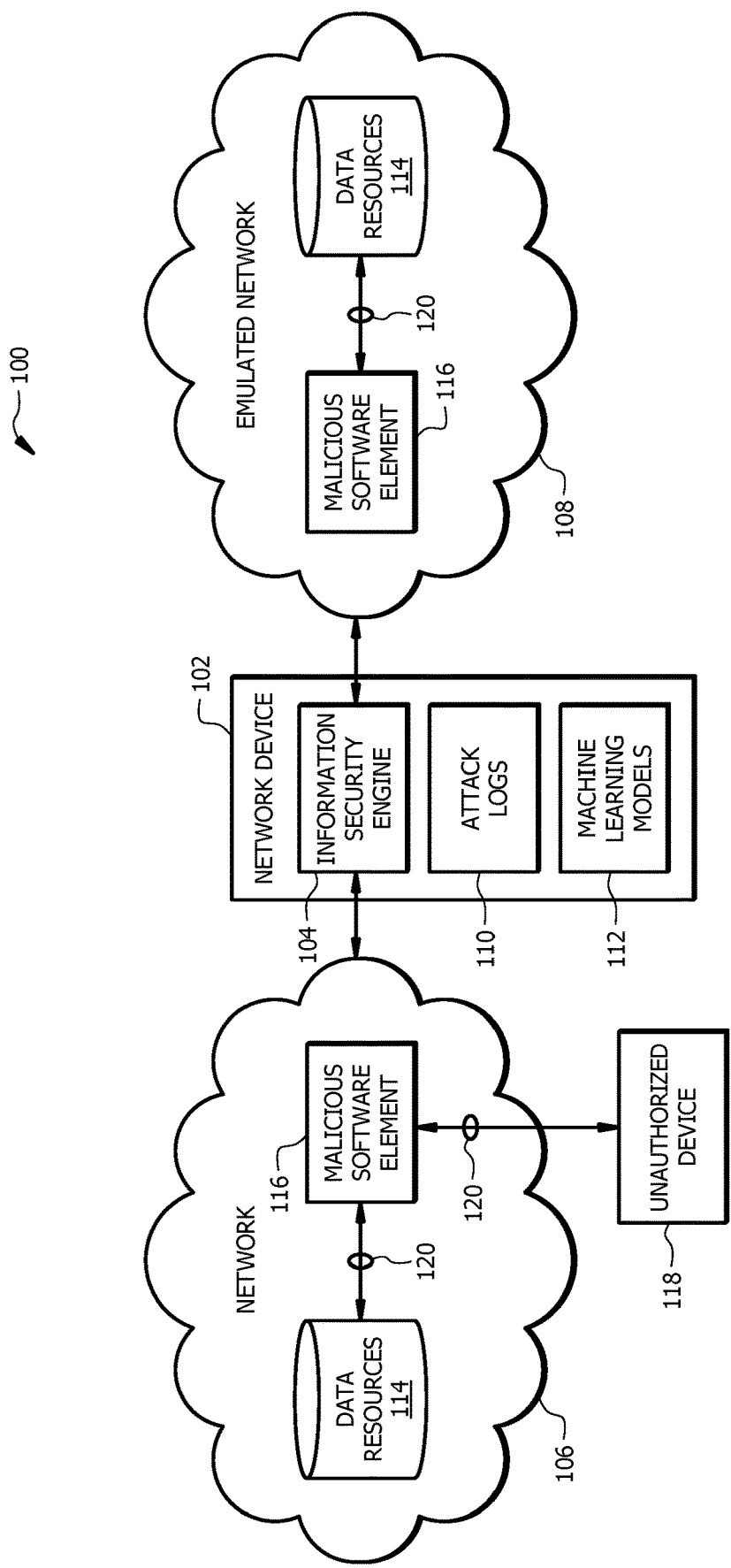
FIG. 1 is a schematic diagram of an information security system configured to employ machine learning.

FIG. 1 is a schematic diagram of an information security system 100 configured to employ machine learning to detect attacks performed by malicious software elements 116 and to train a machine learning model 112 to detect and prevent future attacks. In one embodiment, the information security system 100 comprises a network device 102 that is in signal communication with devices in a network 106 and devices in an emulated network 108. The information security system 100 may be configured as shown or in any other suitable configuration.

Network Device with Information Security Engine

In one embodiment, the network device 102 comprises an information security engine 104, attack logs 110, and machine learning models 112. The network device 102 is in signal communication with devices in the network 106 and the devices in the emulated network 108 using one or more network connections. The network device 102 may employ any suitable type of network connection and/or communication protocol as would be appreciated by one of ordinary skill in the art. In one embodiment, the network device 102 is a member of the network 106. Additional information about the hardware configuration of the network device 102 is described in FIG. 3.

The information security engine 104 is generally configured to detect network attacks and machine learning types of network attacks that are performed by a malicious software element 116 within the network 106. Malicious software elements 116 may be code, instructions, scripts, or applications that are installed or executed onto a compromised device within the network 106. For example, a bad actor may install a malicious software element 116 on a device within the network 106 so that data 120 can be exfiltrated from the network 106. Examples of malicious software elements 116 include, but are not limited to, viruses, malware, worms, spyware, ransomware, trojans, key loggers, or any other type of malicious software.

Machine learning types of network attacks are attacks where a malicious software element 116 changes or adapts its attack approach based on the how the network 106 responds to an attack. For instance, a malicious software element 116 may perform a data exfiltration type attack to extract data 120 from one or more data resources 114 of the network 106 and to transmit the extracted data 120 to an unauthorized device 118 that is located outside of the network 106. Examples of unauthorized devices 118 may include, but are not limited to, mobile devices (e.g. smart phones or tablets), computers, laptops, or any other type of device. As an example, a machine learning type of attack may involve adjusting data transfer file sizes when attempting to exfiltrate data 120 from the network 106. In this example, a malicious software element 116 may first attempt to extract a particular amount of data 120 from the network 106. The network 106, for example, the information security engine 104, may be configured to block any data transmissions that exceed a predefined data transfer limit. In the event that the malicious software element's 116 first attempt is blocked, the malicious software element 116 may attempt to extract and transmit progressively smaller amounts of data 120 from the network 106 until it is able to successfully exfiltrate data 120 from the network 106.

As another example, a machine learning type of attack may involve changing ports when attempting to exfiltrate data 120 from the network 106. In this example, a malicious software element 116 may attempt to extract data 120 from the network 106 using a first port. The network 106, for example the information security engine 104, may be configured to block outgoing data transmissions from particular ports. In the event that the malicious software element's 116 first attempt is blocked, the malicious software element 116 may attempt to send extracted data 120 using other ports until it is able to successfully exfiltrate data 120 from the network 106. In other examples, a malicious software element 116 may adjust or change any other parameters when attempting to exfiltrate data 120 from the network 106.

The information security engine 104 is further configured to isolate a malicious software element 116 within the emulated network 108 and to document the behavior of the malicious software element 116 in an attack log 110. Here, the information security engine 104 relocates the malicious software element 116 to a safe location (i.e. the emulated network 108) where the behavior of the malicious software element 116 can be observed and documented. The attack log 110 comprises information about the behavior characteristics of a malicious software element 116. For example, the attack log 110 may comprise an identifier for a malicious software element 116, information about data resources 114 that are affected by an attack, an attack type (e.g. data exfiltration), data transmission file sizes, information about ports used, or any other suitable type of information associated with an attack.

The information security engine 104 is further configured to train a machine learning model 112 to detect and terminate future machine learning types of attacks based on the information in the attack log 110. Examples of the machine learning model 112 include, but are not limited to, multilayer perceptron or any other suitable type of neural network model. For example, the machine learning model 112 may comprise an input layer, one or more hidden layers, and an output layer. This process allows the information security engine 104 to learn new behavior patterns for attacks on the network 106 and to improve information security defenses based on the learned behavior patterns. An example of the information security engine 104 in operation is described in FIG. 2.

Network

The network 106 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 106 may be configured to support any suitable type of communication protocol as would be appreciated by one of ordinary skill in the art.

The network 106 comprises one or more data resources 114 that are configured to store data for the network 106. Examples of data resources 114 include, but are not limited to, a data store, a server, a network attached storage (NAS) device, a computing device, a shared folder, a memory, or any other suitable type of network device. The network 106 may further comprise any other suitable type or combination of network devices, for example servers, routers, or computers.

Emulated Network

The emulated network 108 is generally configured to provide an environment where a malicious software element 116 can be observed without compromising the network 106 or information stored within the network 106. The emulated network 108 is configured to emulate the network 106 by replicating portions of the network 106. For example, the emulated network 108 may comprise copies of the network devices and the data resources 114 from the network 106. The copies of the data resources 114 in the emulated network 108 are configured such that any data changes do not affect the original data 120 in a data resource 114 in the network 106. In one embodiment, the emulated network 108 may be embedded within a portion of the network 106. For example, a portion of the network 106 may be allocated as the emulated network 108. In other embodiments, the emulated network 108 may be a separate network that is independent from the network 106.

Information Security Process

Figure 2:
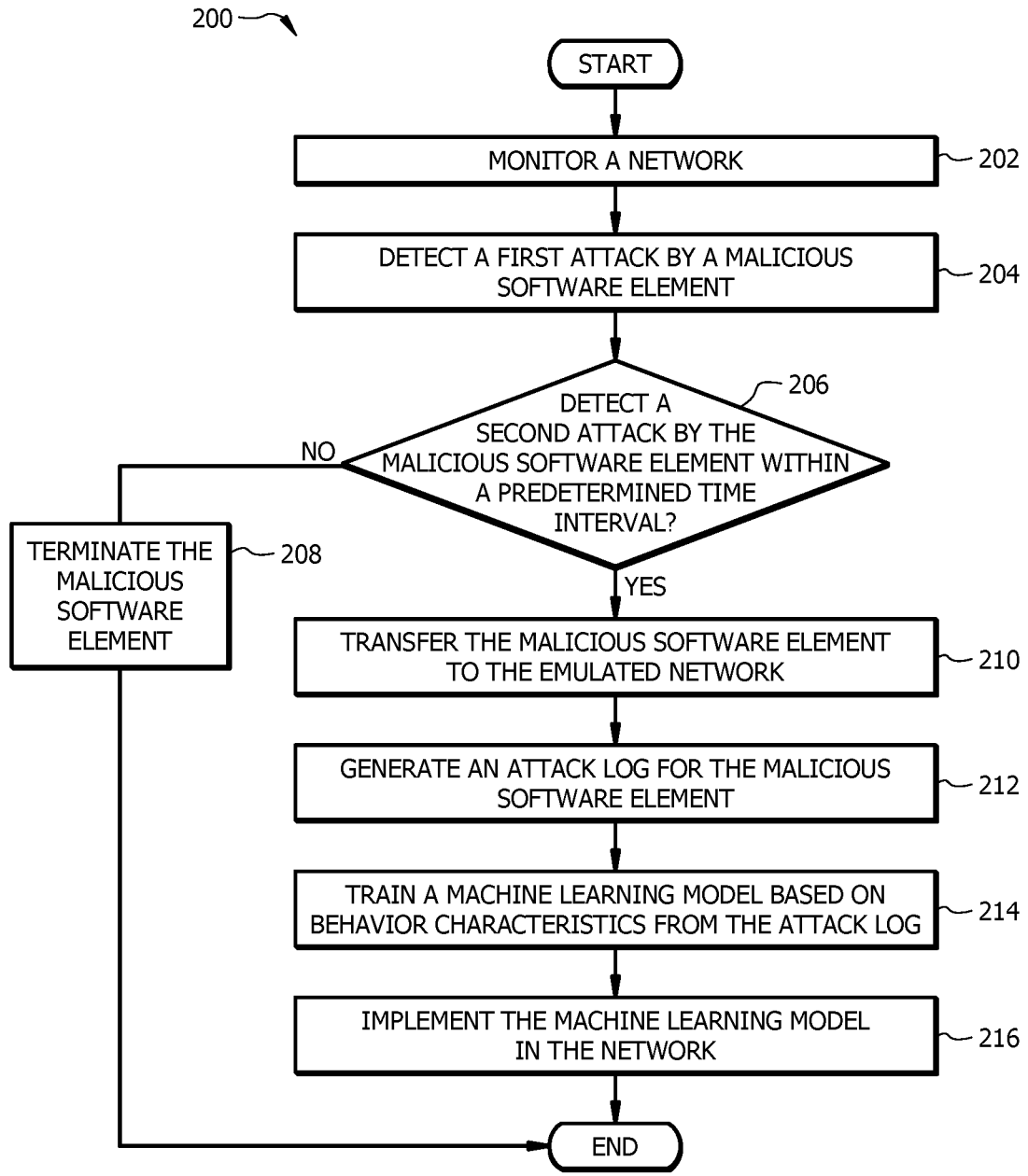
FIG. 2 is a flowchart of an embodiment of a threat detection method.

FIG. 2 is a flowchart of an embodiment of a threat detection method 200. Method 200 may be employed by the information security engine 104 of the network device 102 to detect attacks performed by malicious software elements 116 and to train a machine learning model 112 to detected and prevent future attacks. This process allows the information security engine 104 to learn new behavior patterns for attacks on the network 106 and to improve information security defenses based on the learned behavior patterns.

At step 202, the information security engine 104 monitors the network 106. Here, the information security engine 104 monitors data transmissions by devices within the network 106. For example, the information security engine 104 may monitor when data 120 that is extracted from a data resource 114 and any attempts to transmit the data 120 to devices outside of the network 106.

At step 204, the information security engine 104 detects a first attack by a malicious software element 116. As an example, the information security engine 104 may detect a first attack that attempts to transmit a first portion of data 120 from a data resource 114 in the network 106 to an unauthorized device 118 that is located outside of the network 106. In this example, the first attack may attempt to transmit a file size that exceeds a predefined limit for outgoing data transfers. As another example, the information security engine 104 may detect a first attack that attempts to transmit data 120 from a data resource 114 to an unauthorized device 118 that is located outside of the network 106 using a first port. In this example, the first attack may attempt to transmit the data 120 using a port that is blocked for outgoing data transfers. The information security engine 104 may block the data transmission attempt in response to detecting the first attack.

At step 206, the information security engine 104 determines whether another attack has been detected for the malicious software element 116 within a predetermined time interval from the first attack. The predetermined time interval may be set to five milliseconds, one second, one minute, five minutes, one hour, or any suitable time interval. In one embodiment, the information security engine 104 may set a timer that can be used to determine whether another attack from the malicious software element 116 has been detected within the predetermined time interval.

The information security engine 104 proceeds to step 208 in response to determining that another attack was not detected for the malicious software element 116 within the predetermined time interval. At step 208, the information security engine 104 terminates the malicious software element 116. Here, the information security engine 104 may determine that the malicious software element 116 is not configured to implement a machine learning type of attack. This means that the malicious software element 116 will not likely change or adapt its attack approach overtime and the information security engine 104 may not learn any new behavior patterns by further observing the malicious software element 116. In this case, the information security engine 104 may terminate or disable the malicious software element 116 using any suitable technique as would be appreciated by one of ordinary skill in the art. For example, the information security engine 104 may delete the malicious software element 116.

Returning to step 206, the information security engine 104 proceeds to step 210 in response to determining that another attack was detected for the malicious software element 116 within the predetermined time interval. As an example, the information security engine 104 may detect a second attack within the predetermine time interval that attempts to transmit a second portion of data 120 from the data resource 114 in the network 106 to the unauthorized device 118 that is located outside of the network 106. In this example, the second portion of data 120 may have a smaller file size than the first portion of data 120 that was previously attempted. The second attack may also attempt to transmit a file size that exceeds a predefined limit for outgoing data transfers. As another example, the information security engine 104 may detect a second attack within the predetermine time interval that attempts to transmit data 120 from the data resource 114 in the network 106 to the unauthorized device 118 that is located outside of the network 106 using another port that is blocked for outgoing data transmissions. In one embodiment, the information security engine 104 is configured to block any data transmission attempts in response to detecting another attack.

At step 210, the information security engine 104 transfers the malicious software element 116 to the emulated network 108. Here, the information security engine 104 may extract and relocate the code or files associated with the malicious software element 116 to the emulated network 108. Relocating the malicious software element 116 to a safe location (i.e. the emulated network 108) allows the behavior of the malicious software element 116 to be observed and documented without compromising the security of the network 106.

At step 212, the information security engine 104 generates an attack log 110 for the malicious software element 116. The attack log 110 may comprise information about the behavior characteristics of a malicious software element 116. For example, the attack log 110 may comprise an identifier for a malicious software element 116, information about data resources 114 that are affected by an attack, an attack type (e.g. data exfiltration, changing data transmission file sizes, or changing ports), data transmission file sizes, information about ports used, or any other suitable type of information associated with an attack or technique used by the malicious software element 116. In one embodiment, the information security engine 104 is configured to collect behavior characteristics for the malicious software element 116 over a predetermined time period and to terminate or disable the malicious software element 116 after the predetermined time period has elapsed.

At step 214, the information security engine 104 trains a machine learning model 112 based on behavior characteristics from the attack log 110. In one embodiment, the machine learning model 112 is configured to receive behavior characteristics of the malicious software element 116 and to output a threat response 312 based on the behavior characteristics of the malicious software element 116. The threat response 312 may comprise instructions or actions to perform on the malicious software element 116. Examples of actions may include, but are not limited to, terminating the malicious software element 116, isolating malicious software element 116, ignoring malicious software element 116, or performing any other suitable type of action.

In another embodiment, the machine learning model 112 is configured to receive behavior characteristics of the malicious software element 116 and to output a threat signature 310 based on the behavior characteristics of the malicious software element 116. The threat signature 310 may comprise information for identifying malicious software elements 116. For example, a threat signature 310 may comprise code, filenames, or any suitable type of identifier for a malicious software element 116. In other embodiments, the machine learning model 112 may be configured to generate any other suitable type of output based on the behavior characteristics of the malicious software element 116.

At step 216, the information security engine 104 implements the machine learning model 112 in the network 106. Implementing the machine learning model 112 in the network 106 allows the information security engine 104 to detect other malicious software elements 116 and to prevent or mitigate any future network attacks. For example, the information security engine 104 may monitor the network 106 to identify behavior characteristics for a second software element. The information security engine 104 may input the behavior characteristics for the second software element into the machine learning model 112 to obtain a threat response 312 for the second software element. In the event that the second software element is determined to be a malicious software element 116, the information security engine 104 may perform any actions indicated by the threat response 312 for the second software element.

As another example, the information security engine 104 may input the behavior characteristics for the second software element into the machine learning model 112 to obtain a threat signature 310. The information security engine 104 may determine whether the threat signature 310 for the second software element matches a threat signature 310 for a malicious software element 116. In response to determining that the threat signature 310 for the second software element matches a threat signature 310 for a malicious software element 116, the information security engine 104 may determine that the second software element is a malicious software element 116 and may terminate or isolate the second software element.

Network Device Hardware Configuration

Figure 3:
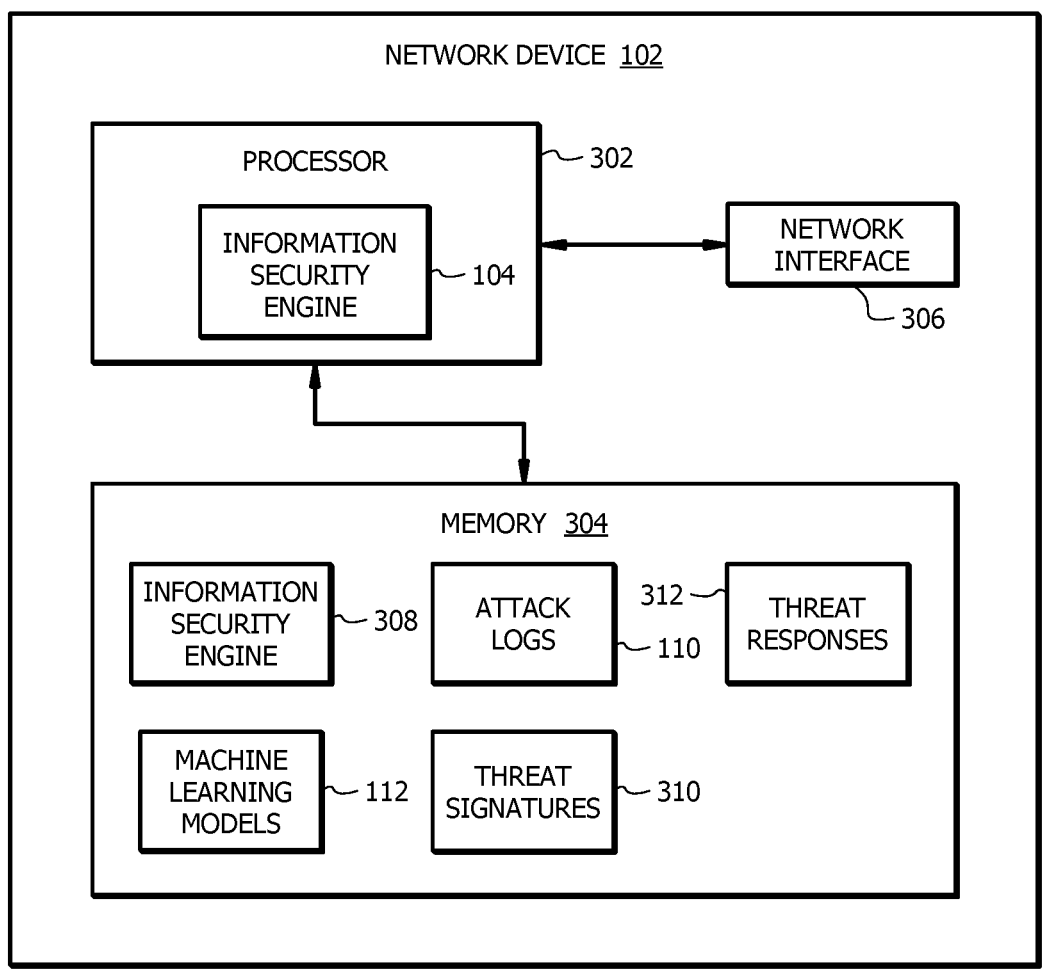
FIG. 3 is an embodiment of a device configured to provide information security using machine learning.

FIG. 3 is an embodiment of a device (e.g. network device 102) configured to provide information security using machine learning. The network device 102 comprises a processor 302, a memory 304, and a network interface 306. The network device 102 may be configured as shown or in any other suitable configuration.

The processor 302 comprises one or more processors operably coupled to the memory 304. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 304. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement an information security engine 104. In this way, processor 302 may be a special purpose computer designed to implement the functions disclosed herein. In an embodiment, the information security engine 104 is implemented using logic units, FPGAs, ASICs, DSPs, or any other suitable hardware. The information security engine 104 is configured operate as described in FIGS. 1 and 2. For example, the information security engine 104 may be configured to perform the steps of method 200 as described in FIG. 2.

The memory 304 comprises one or more disks, tape drives, or solid-state drives, and may be used as an over-flow data storage device, to store programs when such programs are selected for execution, and to store instructions and data that are read during program execution. The memory 304 may be volatile or non-volatile and may comprise read-only memory (ROM), random-access memory (RAM), ternary content-addressable memory (TCAM), dynamic random-access memory (DRAM), and static random-access memory (SRAM).

The memory 304 is operable to store information security instructions 308, machine learning models 112, attack logs 110, threat signatures 310, threat responses 312, and/or any other data or instructions. The information security instructions 308 may comprise any suitable set of instructions, logic, rules, or code operable to execute the information security engine 104. The machine learning models 112, the attack logs 110, the threat signatures 310, and the threat responses 312 are configured similar to the machine learning models 112, the attack logs 110, the threat signatures 310, and the threat responses 312 described in FIGS. 1 and 2, respectively.

The network interface 306 is configured to enable wired and/or wireless communications. The network interface 306 is configured to communicate data between the network device 102 and other devices (e.g. user devices and/or network devices in the network 106), systems, or domain. For example, the network interface 306 may comprise a WIFI interface, a LAN interface, a WAN interface, a modem, a switch, or a router. The processor 302 is configured to send and receive data using the network interface 306. The network interface 306 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An information security system comprising: a network comprising a plurality of data resources configured to store data; an emulated network comprising copies of the plurality of data resources; and a hardware processor configured to:
monitor data transmissions within the network; detect a first attack by a malicious software element, wherein the first attack attempts to transmit a first portion of data from a data resource in the network to a device located outside of the network;
detect a second attack by the malicious software element within a predetermined time interval from the first attack, wherein: the second attack reduces a data transfer file size that does not exceed a predefined data transfer limit during an exfiltration attempt to transmit a second portion of data from the data resource in the network to the device located outside of the network; and
the second portion of data from the data resource has a smaller file size than the first portion of data from the data resource; transfer the malicious software element from the network to the emulated network in response to detecting the second attack;
generate an attack log comprising behavior characteristics for attacks performed by the malicious software element in the emulated network, wherein the behavior characteristics identify: data resources affected by the software element and file sizes for data transmission attempts by the malicious software element; and
an attack type indicating a technique used by the malicious software element; and train a machine learning model based on behavior characteristics from the attack log, wherein the machine learning model is configured to: receive behavior characteristics of the malicious software element; and
output a threat response indicating an action to perform on the malicious software element based at least in part on the behavior characteristics of the malicious software element.

2. The system of claim 1, wherein
the information security engine is configured to:
identify behavior characteristics for a second software element;
input the behavior characteristics for the second software element into the machine learning model;
obtain the threat response; and
perform the action indicated by the threat response on the second software element.

3. The system of claim 1, wherein:
the machine learning model is further configured to:
output a threat signature for the malicious software element; and
the information security engine is configured to:
identify behavior characteristics for a second software element;
input the behavior characteristics for the second software element into the machine learning model;
obtain a threat signature for the second software element;
determine the threat signature for the second software element matches a threat signature for the malicious software element; and
terminate the second software element in response to the determination.

4. The system of claim 1, wherein generating the attack log comprises:
collecting behavior characteristics for the malicious software element over a predetermined time period; and
terminating the software element after the predetermined time period has elapsed.

5. The system of claim 1, wherein the security engine is configured to:
block the transmission of the first portion of data to the device located outside of the network; and
block the transmission of the second portion of data to the device located outside of the network.

6. The system of claim 1, wherein the behavior characteristics in the attack log identifies ports used by the malicious software element.

7. A threat detection method, comprising: monitoring, data transmissions within a network;
detecting, a first attack by a malicious software element, wherein the first attack attempts to transmit a first portion of data from a data resource in the network to a device located outside of the network; detecting, a second attack by the malicious software element within a predetermined time interval from the first attack, wherein: the second attack reduces a data transfer file size that does not exceed a predefined data transfer limit during an exfiltration attempt to transmit a second portion of data from the data resource in the network to the device located outside of the network; and
the second portion of data from the data resource has a smaller file size than the first portion of data from the data resource;
transferring, the malicious software element from the network to an emulated network in response to detecting the second attack, wherein the emulated network comprises copies of one or more data resources of the network;
generating, an attack log comprising behavior characteristics for attacks performed by the malicious software element in the emulated network, wherein the behavior characteristics identify: data resources affected by the software element and file sizes for data transmission attempts by the malicious software element; and
an attack type indicating a technique used by the malicious software element; and
training, a machine learning model based on behavior characteristics from the attack log, wherein the machine learning model is configured to: receive behavior characteristics of the malicious software element; and output a threat response indicating an action to perform on the malicious software element based at least in part on the behavior characteristics of the malicious software element.

8. The method of claim 7, further comprising:
identifying behavior characteristics for a second software element;
inputting the behavior characteristics for the second software element into the machine learning model;
obtaining a threat response from the machine learning model, wherein the threat response indicates an action to perform on the second software element; and
performing the action indicated by the threat response on the second software element.

9. The method of claim 7, further comprising:
identifying behavior characteristics for a second software element;
inputting the behavior characteristics for the second software element into the machine learning model;
obtaining a threat signature for the second software element;
determining the threat signature for the second software element matches a threat signature for the malicious software element; and
terminating the second software element in response to the determination.

10. The method of claim 7, wherein generating the attack log comprises:
collecting behavior characteristics for the malicious software element over a predetermined time period; and
terminating the software element after the predetermined time period has elapsed.

11. The method of claim 7, further comprising:
blocking the transmission of the first portion of data to the device located outside of the network; and
blocking the transmission of the second portion of data to the device located outside of the network.

12. The method of claim 7, wherein the behavior characteristics in the attack log identifies ports used by the malicious software element.

13. A computer program comprising executable instructions stored in a non-transitory computer readable medium that when executed by a processor causes the processor to:
monitor data transmissions within a network;
detect a first attack by a malicious software element, wherein the first attack attempts to transmit a first portion of data from a data resource in the network to a device located outside of the network;
detect a second attack by the malicious software element within a predetermined time interval from the first attack, wherein: the second attack reduces a data transfer file size to attempt to transmit a second portion of data from the data resource in the network to the device located outside of the network; and
the second portion of data from the data resource has a smaller file size than the first portion of data from the data resource;
transfer the malicious software element from the network to an emulated network in response to detecting the second attack, wherein the emulated network comprises copies of one or more data resources of the network;
generate an attack log comprising behavior characteristics for attacks performed by the malicious software element in the emulated network, wherein the behavior characteristics identify: data resources affected by the software element; and
an attack type indicating a technique used by the malicious software element; and
train a machine learning model based on behavior characteristics from the attack log, wherein the machine learning model is configured to: receive behavior characteristics of the malicious software element; and
output a threat response indicating an action to perform on the malicious software element based at least in part on the behavior characteristics of the malicious software element.

14. The computer program of claim 13, further comprising instructions that when executed by the processor causes the processor to:
identify behavior characteristics for a second software element;
input the behavior characteristics for the second software element into the machine learning model;
obtain a threat response from the machine learning model, wherein the threat response indicates an action to perform on the second software element; and
perform the action indicated by the threat response on the second software element.

15. The computer program of claim 13, further comprising instructions that when executed by the processor causes the processor to:
identify behavior characteristics for a second software element;
input the behavior characteristics for the second software element into the machine learning model;
obtain a threat signature for the second software element;
determine the threat signature for the second software element matches a threat signature for the malicious software element; and
terminate the second software element in response to the determination.

16. The computer program of claim 13, wherein generating the attack log comprises:
collecting behavior characteristics for the malicious software element over a predetermined time period; and
terminating the software element after the predetermined time period has elapsed.

17. The computer program of claim 13, further comprising instructions that when executed by the processor causes the processor to:
block the transmission of the first portion of data to the device located outside of the network; and
block the transmission of the second portion of data to the device located outside of the network.

* * * * *